Patented Jan. 21, 1947

2,414,783

UNITED STATES PATENT OFFICE 2,414,783

PYRIDONES AND PROCESS FOR MAKING THEM

Wilhelm Wenner, Montclair, and John Thomas Plati, Passaic, N. J., assignors to Hoffmann-La Roche Inc., Nutley, N. J., a corporation of New Jersey No Drawing. Application July 17, 1945, Serial No. 605,624

13 Claims. (Cl. 260—297)

Our invention relates to a new class of chemical compounds, and more particularly to a new class of chemical substances possessing utility as intermediates in the preparation of other chemical compounds, such as therapeutic agents.

An important object of the invention resides in the provision of a novel and effective method of producing the chemical compounds with which the present invention is concerned.

Other objects will become apparent in the light of the following description of the invention.

The substances of our invention are, in general, 2-pyridones of the formulae

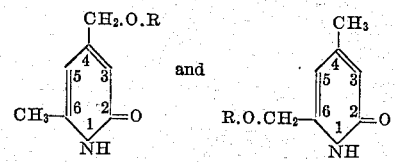

wherein R is selected from the group consisting of hydrogen, alkyl, and aralkyl. Moreover, as is the case with pyridones, the compounds may exist in the corresponding tautomeric hydroxy forms

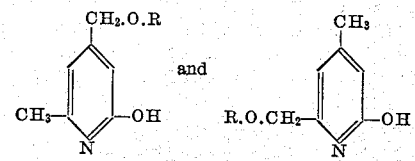

wherein R has the above significance.

Specific examples of compounds which are embraced by the foregoing formulae are:

4-ethoxymethyl-6-methyl-2-pyridone
4-benzyloxymethyl-6-methyl-2-pryidone
4-methoxymethyl-6-methyl-2-pyridone
4-hydroxymethyl-6-methyl-2-pyridone
4-methyl-6-ethoxymethyl-2-pyridone
4-methyl-6-methoxymethyl-2-pyridone
4-methyl-6-hydroxymethyl-2-pyridone
4-methyl-6-propyloxymethyl-2-pyridone
4-methyl-6-benzyloxymethyl-2-pyridone It will, of course, be understood that while the compounds mentioned above are individual, pure compounds, it is contemplated that such may, if desired, be prepared and effectively employed in the form of impure reacting mixtures. It will also be appreciated that mixtures of two or more of said compounds, in the pure or impure state, can also be utilized.

These novel 2-pyridones may be derived from 2-pyridones in which the 3-position of the nucleus is substituted and which are represented by the general formulae

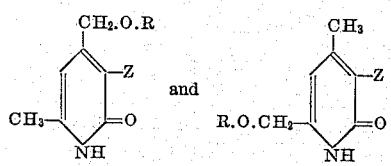

in which R has the above indicated meaning, and Z is carboxyl (COOH) or a functional derivative or equivalent thereof, such as cyano, carbamido, lactone, ester, salt, or anhydride. It will be apparent that in the case of an anhydride the actual formula would involve linkage of two pyridone nuclei, as is customary in anhydrides of such organic acids. Accordingly, it will be understood that the formulae given above for the initial materials are intended to embrace the anhydrides. It will also be understood that the lactones will be embraced by the above formulae, notwithstanding that such lactones possess an inner ester linkage.

The anhydride structure of a suitable starting material may be represented as follows:

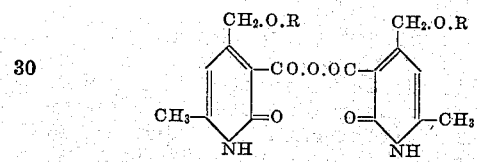

The structure of a lactone which may be employed is shown as follows:

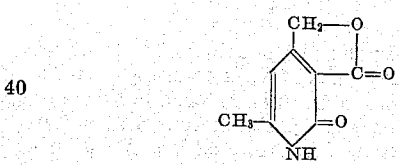

The class of starting compounds includes, among others, 3-cyano-4-ethoxymethyl-6-methyl-2-pyridone, which is a well known intermediate in the synthesis of vitamin B6 (see H. R. Rosenberg, Chemistry and Physiology of the Vitamins, 1942, pp. 204–5). 3-cyano-4-methyl-6-ethoxymethyl-2-pyridone may also be employed. This latter material has, heretofore, been a waste product in the vitamin B6 synthesis.

It will be obvious that the nature of the desired product will influence the choice of the compound employed as a starting material. Thus the lactone of 3-carboxy-4-hydromethyl-6-methyl-2-pyridone, having the following formula

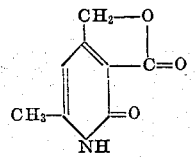

yields 4-hydroxymethyl-6-methyl-2-pyridone, having the formula

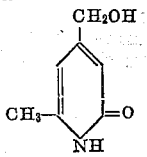

It follows, additionally, that starting pyridones, substituted by methyl in the 6-position, will yield 6-methyl substituted end-products; while starting materials having an initial 4-methyl substituent, will produce corresponding 4-methyl substituted end-products.

The process, in general, involves subjecting the 3-substituted starting pyridone to the action of alkali, such as sodium hydroxide, potassium hydroxide, sodium carbonate, and the like. The alkali agent has the surprising ability of splitting off the substituent in the 3-position. The mechanism involves the conversion of cyano, carbamido, carbalkoxy, lactonized carboxylic derivatives, and anhydrides, to the carboxylic acid in the form of its alkali salt. The latter then loses carbon dioxide to yield the sought-for pyridones. The reaction is carried out above 100° C.

The new compounds prepared by this method are crystalline solids, easily soluble in organic solvents and somewhat soluble in water. They are stable; and, in most instances, they are capable of being distilled at reduced pressure without decomposition. They can be readily purified by recrystallization. Being amphoteric in nature, they have the property of forming salts with both acids and bases, and thereby the solubility in water is greatly increased. Halogenation of these compounds produces derivatives having pharmaceutical value.

The procedure for the removal of the carboxyl group, or its functional equivalent, comprises heating the initial 2-pyridone with dilute aqueous alkali to temperatures above 100° C. for several hours. The rate of reaction can be increased by operating at high temperatures. Temperatures as high as 180° C. have been found to be suitable, there being no decomposition of the reaction product even at this point. Preferably, a temperature of 160°–180° C. is employed.

The full significance of the invention will be made apparent by the following examples, which are illustrative of the manner of producing some of the compounds contemplated herein, and which will serve as a guide for those skilled in the art to produce other similar compounds.

Example 1

*4-ethoxymethyl-6-methyl-2-pyridone*

A mixture of 100 parts of 3-cyano-4-ethoxymethyl-6-methyl-2-pyridone, 50 parts of sodium hydroxide and 1000 parts of water is heated in an autoclave at 170° for 24 hours. The solution is acidified with hydrochloric acid to pH 5.8 and extracted three times with 500 parts of chloroform. The residue obtained after distillation of the chloroform is almost pure 4-ethoxymethyl-6-methyl-2-pyridone of M. P. 108°.

Example 2

*4-methoxymethyl-6-methyl-2-pyridone*

A mixture of 3-cyano-4-methoxymethyl-6-methyl-2-pyridone (60 parts), sodium hydroxide (30 parts) and water (200 parts) is heated to 160° for 20 hours in autoclave. Hydrochloric acid is added until the pH is 6. The mixture is then extracted repeatedly with chloroform. Evaporation of the chloroform extract yields 45 parts of 4-methoxymethyl-6-methyl-2-pyridone of M. P. 129°.

Example 3

*4-hydroxymethyl-6-methyl-2-pyridone*

10 parts of the lactone of 3-carboxy-4-hydroxymethyl-6-methyl-2-pyridone and 100 parts of 5% aqueous sodium hydroxide are heated in an autoclave to 175° for ten hours. On standing overnight, the crystalline precipitate is filtered and dissolved in 20 parts of hot water. The hot solution is acidified with hydrochloric acid to a pH of 6 and allowed to crystallize. 4-hydroxymethyl-6-methyl-2-pyridone is obtained in colorless crystals of M. P. 212°. An additional amount is obtained from the original alkaline filtrate on acidification. Crystallization from alcohol yields the pure compound of M. P. 214°.

Example 4

*4-ethoxymethyl-6-methyl-2-pyridone*

A solution of 10 parts 3-carbamido-4-ethoxymethyl-6-methyl-2-pyridone in 100 parts of 6% sodium hydroxide is heated in autoclave to 170° for 25 hours. The solution which smells of ammonia is acidified with sulphuric acid to pH 6.5 and extracted repeatedly with chloroform. On distillation of the chloroform-4-ethoxymethyl-6-methyl-2-pyridone is obtained. Recrystallization from ethyl acetate yields the pure compound of M. P. 108°, identical with the product obtained in Example 1.

Example 5

*4-methyl-6-ethoxymethyl-2-pyridone*

A hot solution of 10 parts of 3-cyano-4-methyl-6-ethoxymethyl-2-pyridone in 100 parts of 4% sodium hydroxide is heated in an autoclave to 165° for 40 hours. The resulting mixture was cooled and saturated with carbon dioxide. 4-methyl-6-ethoxymethyl-2-pyridone separates in colorless crystals of M. P. 104°.

Example 6

*4-methyl-6-methoxymethyl-2-pyridone*

10 parts of 3-cyano-4-methyl-6-methoxymethyl-2-pyridone are dissolved in 50 parts of 8% sodium hydroxide by heating to 80°. The hot solution is heated in an autoclave at 180° for 15 hours. Hydrochloric acid is added to pH 7. The solution is extracted repeatedly with chloroform. On distillation of the chloroform 4-methyl-6-methoxymethyl-2-pyridone is obtained, which upon recrystallization from ethyl acetate yields a product having a M. P. of 92°.

Example 7

*4-methyl-6-hydroxymethyl-2-pyridone*

A solution of 10 g. of 3-cyano-4-methyl-6-hydroxymethyl-2-pyridone in 100 cc. of 5% sodium hydroxide is heated in an autoclave at 170° for 24 hours. The solution, which smells strongly of ammonia, is acidified with hydrochloric acid to a pH of 6. On standing crystals of 4-methyl-6-hydroxymethyl-2-pyridone gradually appear.

The filtrate is evaporated to dryness, and the residue is extracted with ethyl alcohol. On distillation of the alcohol a further crop of 4-methyl-6-hydroxymethyl-2-pyridone was obtained. The compound is purified by sublimation at 170° under a pressure of 0.2-0.4 mm. and by crystallization from water or ethyl alcohol. The pure compound melts at 224°-224.5°.

EXAMPLE 8

*4-benzyloxymethyl-6-methyl-2-pyridone*

5 parts of 3-cyano-4-benzyloxymethyl-6-methyl-2-pyridone, M. P. 210°, and 20 parts of 10% aqueous potassium hydroxide are heated in an autoclave to 160° for 20 hours. The lightly colored solution is acidified with hydrochloric acid, whereupon 4-benzloxymethyl-6-methyl-2-pyridone separates. Recrystallization from 70% alcohol yields the pure compound of M. P. 138°.

EXAMPLE 9

*4-ethoxymethyl-6-methyl-2-pyridone*

A mixture of 20 parts of 3-cyano-4-ethoxymethyl-6-methyl-2-pyridone, 10 parts of potassium hydroxide, 100 parts of water and 100 parts of alcohol is heated in an autoclave at 170° for 24 hours. The solution is acidified with hydrochloric acid to pH 5.9 and distilled to dryness. The residue is extracted repeatedly with chloroform. The chloroform solution is distilled to dryness, leaving almost pure 4-ethoxymethyl-6-methyl-2-pyridone, M. P. 108°.

EXAMPLE 10

*4-methoxymethyl-6-methyl-2-pyridone*

6 parts of 3-cyano-4-methoxymethyl-6-methyl-2-pyridone, 4 parts of potassium hydroxide, 15 parts of methanol and 5 parts of water are heated to 160° for 20 hours in an autoclave. The resulting solution is acidified with sulphuric acid to pH 6. It is then evaporated to dryness. The residue is extracted with chloroform. Evaporation of the chloroform gives 4-methoxymethyl-6-methyl-2-pyridone, M. P. 129°.

EXAMPLE 11

*4-ethoxymethyl-6-methyl-2-pyridone*

20 parts of 3-cyano-4-ethoxymethyl-6-methyl-2-pyridone, 12.3 parts of sodium carbonate, and 200 parts of water are heated in an autoclave at 165°-170° for 24 hours. The mixture is acidified with hydrochloric acid to pH 1.6. and the undissolved material is filtered. The filtrate is treated with sodium hydroxide to pH 5.92 and extracted four times with 100 volumes of chloroform. The chloroform is evaporated to give almost pure 4-ethoxymethyl-6-methyl-2-pyridone.

In place of the starting materials of the previous examples, the corresponding 3-carboxy-2-pyridones or their esters, or their alkali metal salts may be employed.

It will be appreciated that the proportions of reactants, times of reaction, temperatures of reactions, and the like may be varied and that supplementary processes, such as purification and the like, may be resorted to wherever found desirable or convenient. These and other variations and modifications will be evident to those skilled in the art in the light of the guiding principles disclosed herein.

Wherever the term "2-pyridone" is employed in the claims, it will be understood to cover both tautomeric forms, as specifically mentioned above.

What we claim as new and desire to protect by Letters Patent of the United States is:

1. 2-pyridones selected from the group consisting of

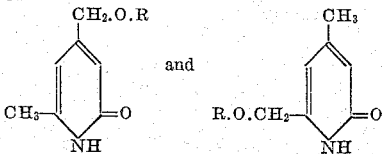

wherein R is a member of the group consisting of hydrogen, alkyl, and aralkyl.

2. 2-pyridones corresponding to the formula

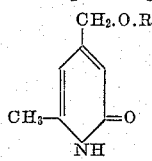

wherein R is a member of the group consisting of hydrogen, alkyl, and aralkyl.

3. 2-pyridones corresponding to the formula

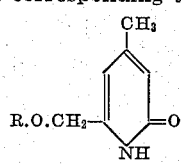

wherein R is a member of the group consisting of hydrogen, alkyl, and aralkyl.

4. 4-ethoxymethyl-6-methyl-2-pyridone.
5. 4-hydroxymethyl-6-methyl-2-pyridone.
6. 4-methyl-6-ethoxymethyl-2-pyridone.
7. Process which comprises treating a 2-pyridone selected from the group consisting of

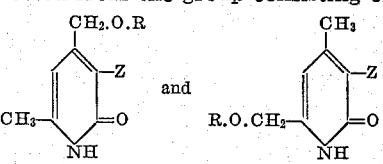

wherein R is a member of the group consisting of hydrogen, alkyl, and aralkyl, and Z is a member selected from the group of carboxyl, carbamido, acyloxy, cyano, COO-alkali metal, and lactones and anhydrides thereof, with aqueous alkali at a temperature above 100° C., for a time sufficient to remove the Z substituent.

8. The process of claim 7, in which the temperature is maintained at 160°-180° C.

9. The process of claim 7 wherein the material subjected to the treatment with alkali is the 4-methyl substituted-2-pyridone.

10. The process of claim 7 wherein the material subjected to the treatment with alkali is the 6-methyl substituted-2-pyridone.

11. The process of preparing 4-ethoxymethyl-6-methyl-2-pyridone, which comprises heating 3-cyano-4-ethoxymethyl-6-methyl-2-pyridone with an aqueous solution of sodium hydroxide at 170° C. for 24 hours.

12. The process for preparing 4-hydroxymethyl-6-methyl-2-pyridone, which comprises heating the lactone of 4-hydroxymethyl-6-methyl-2-pyridone-3-carboxylic acid with dilute sodium hydroxide at 175° C. for 10 hours.

13. The process for preparing 4-methyl-6-ethoxymethyl-2-pyridone, which comprises heating 3-cyano-4-methyl-6-ethoxymethyl-2-pyridone with dilute sodium hydroxide at 165° C. for 40 hours.

WILHELM WENNER.
JOHN THOMAS PLATI.